May 5, 1964     J. J. BUCHWALDER     3,131,500

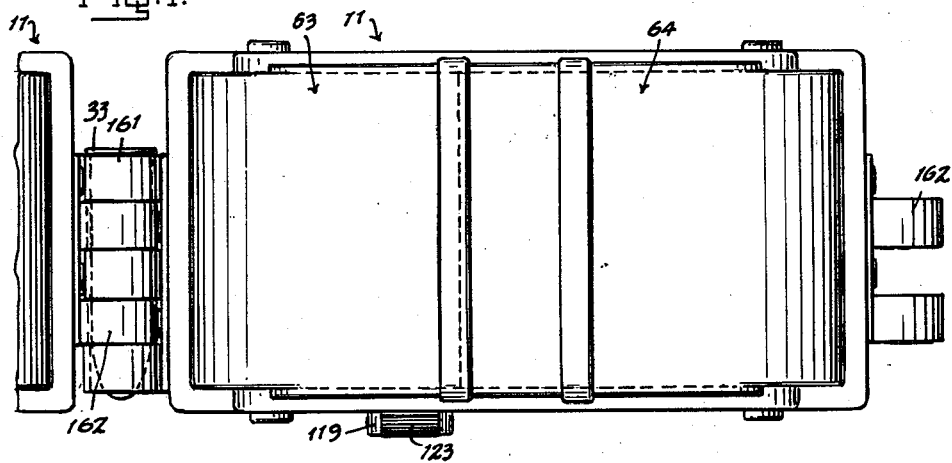
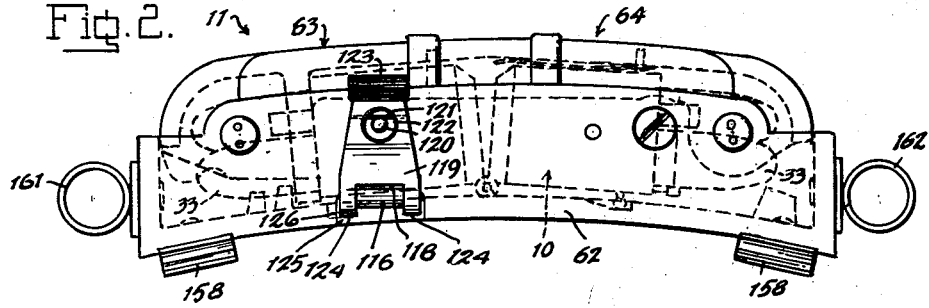
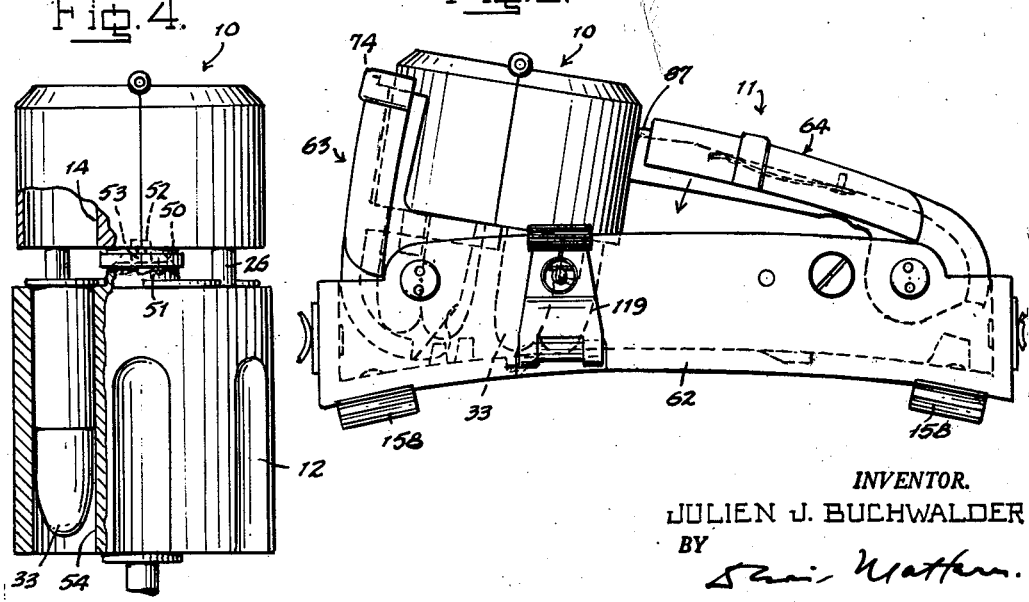

CARTRIDGE LOADER FOR REVOLVERS AND CARRYING CASE THEREFOR

Filed March 21, 1961     5 Sheets-Sheet 2

INVENTOR.
JULIEN J. BUCHWALDER
BY
ATTORNEY.

May 5, 1964  J. J. BUCHWALDER  3,131,500
CARTRIDGE LOADER FOR REVOLVERS AND CARRYING CASE THEREFOR
Filed March 21, 1961  5 Sheets-Sheet 3
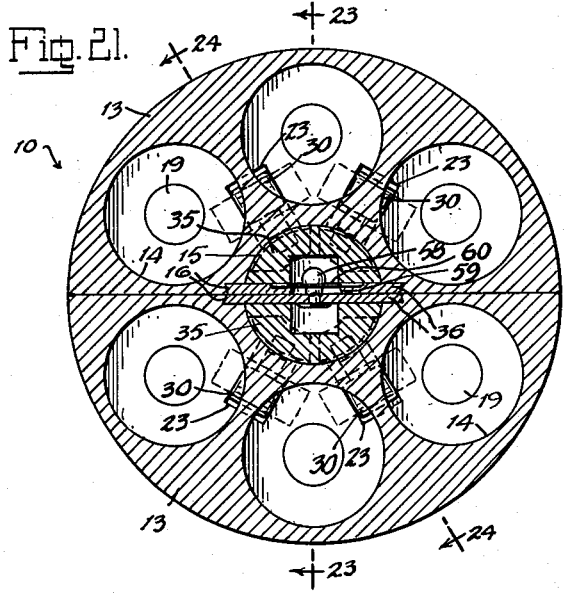
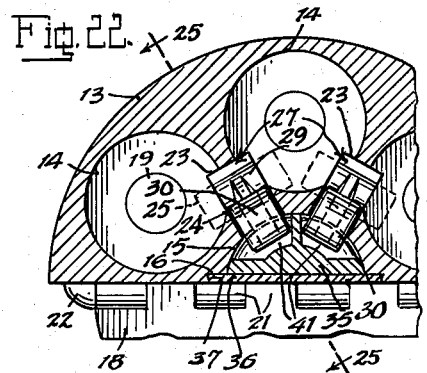
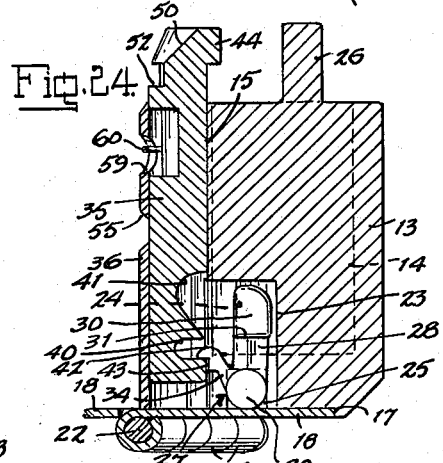
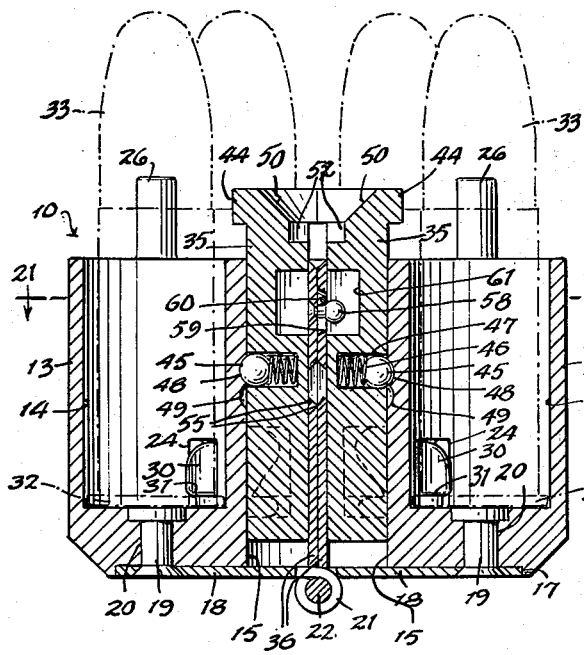
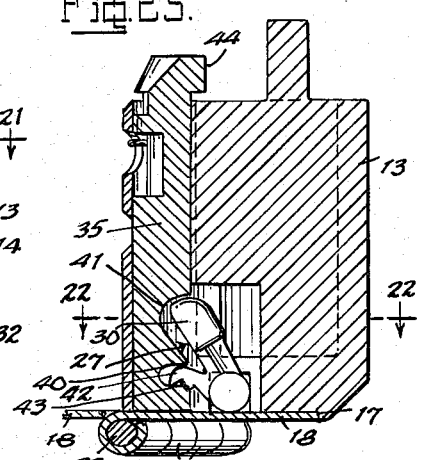
INVENTOR.
JULIEN J. BUCHWALDER
BY
ATTORNEY.

May 5, 1964     J. J. BUCHWALDER     3,131,500
CARTRIDGE LOADER FOR REVOLVERS AND CARRYING CASE THEREFOR
Filed March 21, 1961     5 Sheets-Sheet 4
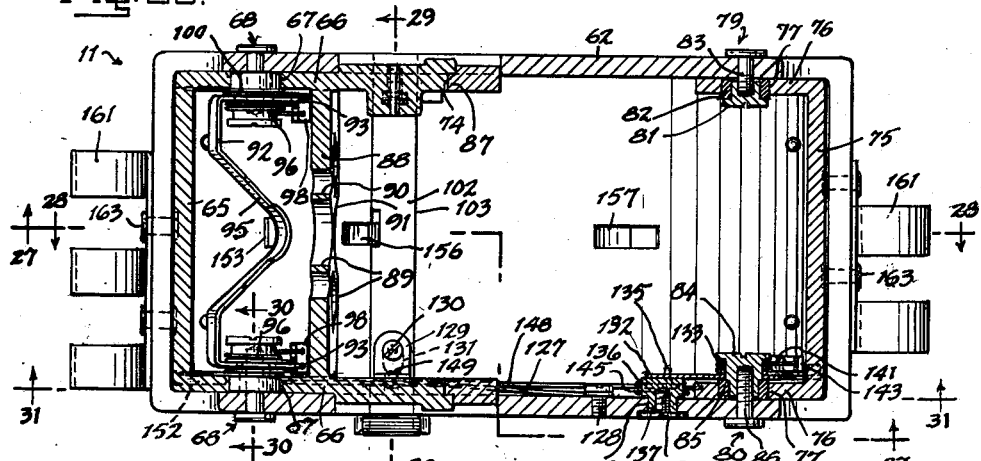
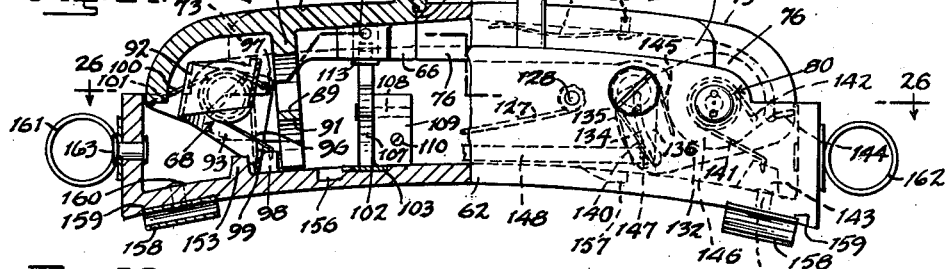
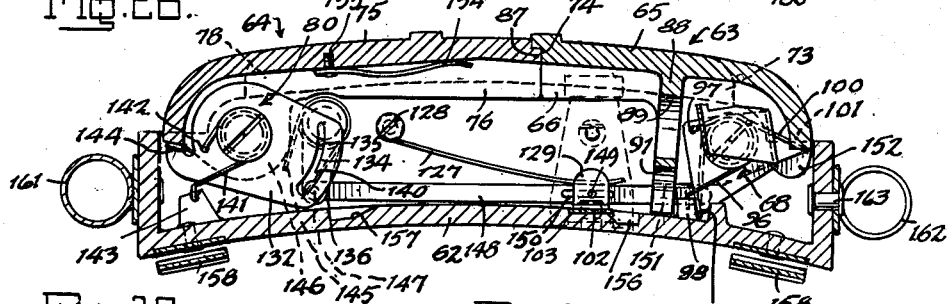
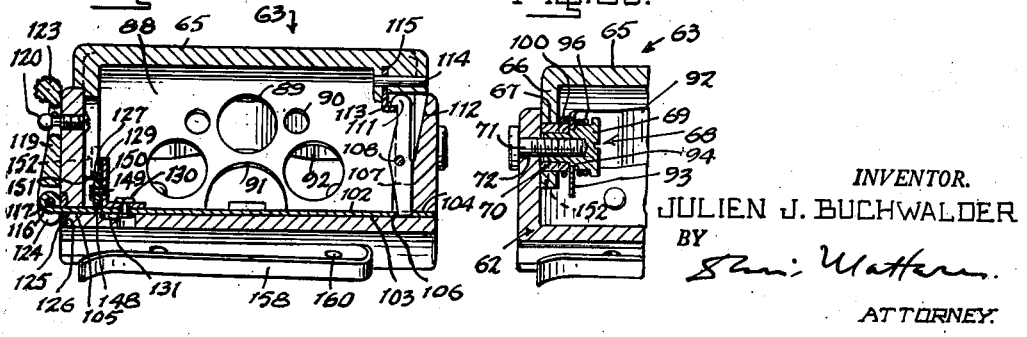
INVENTOR.
JULIEN J. BUCHWALDER
BY
ATTORNEY.

May 5, 1964   J. J. BUCHWALDER   3,131,500
CARTRIDGE LOADER FOR REVOLVERS AND CARRYING CASE THEREFOR
Filed March 21, 1961   5 Sheets-Sheet 5
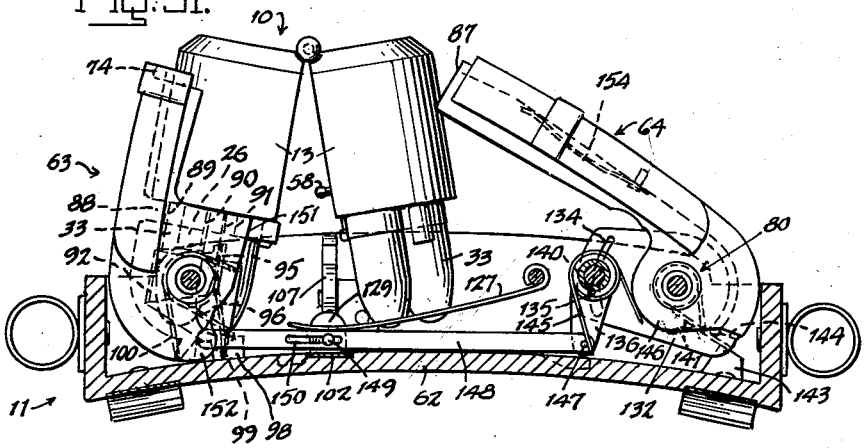
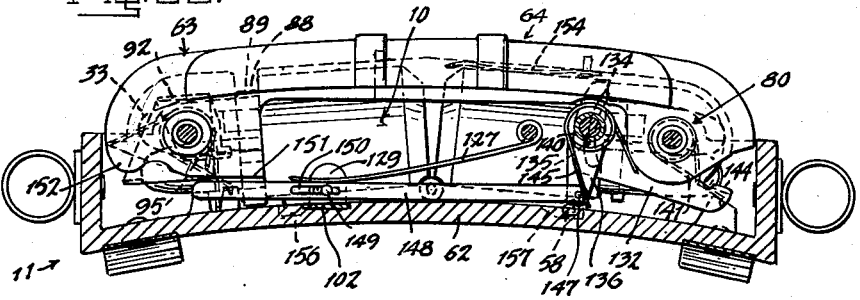
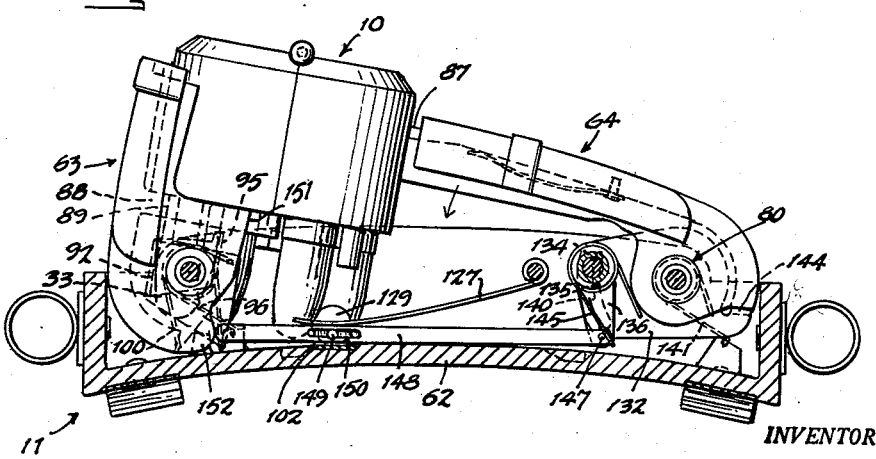
INVENTOR.
JULIEN J. BUCHWALDER
BY
ATTORNEY United States Patent Office 3,131,500
Patented May 5, 1964

3,131,500
CARTRIDGE LOADER FOR REVOLVERS AND CARRYING CASE THEREFOR
Julien J. Buchwalder, Trumbull, Conn., assignor to United Eastern Corporation, Trumbull, Conn., a corporation of Connecticut
Filed Mar. 21, 1961, Ser. No. 97,384
12 Claims. (Cl. 42—89)

The present invention relates to a cartridge loader for revolvers and carrying case therefor, and is particularly concerned with a device of this character for use by law enforcement officers to enable a full complement of cartridges to be quickly and easily inserted in a revolver cylinder, particularly in critical situations where the life of the officer may depend upon the rapid reloading of the revolver.

An object of the invention is to provide a cartridge carrying loader which may be quickly and positively brought into cooperative relation with the revolver cylinder to deposit the cartridges therein. Another object is to provide a loader comprising a pair of hinged half-parts having open and closed positions, the open position disposing the hinged parts in an extended flattened position having a substantially reduced thickness dimension, compared to the thickness dimension in the closed position, to enable the compact placement of the loader in the carrying case of the invention, and whereby the latter may be of compact substantially flattened contour to enable it to be inconspicuously carried upon a belt in a position for ready access. A further object is to provide a carrying case of substantially flat belt-conforming contour adapted to be supported upon a belt as one of a plurality of similar linked together carrying cases.

Another object is to provide a carrying case having a normally latched closure which upon unlatching automatically presents the loader in its closed position ready to be manually removed with the cartridges carried thereby properly oriented for bringing them into registering relation with the revolver cylinder, thus enabling the revolver to be rapidly reloaded even though the reloading operation may be carried out in the dark or while the eyes of the enforcement officer remain upon the target. Further objects are to provide a loader and carrying case of extremely compact and light-weight construction in which the major parts lend themselves to economical production from molded plastic material.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a front elevation showing the carrying case according to the invention with a similar carrying case linked thereto;

FIG. 2 is a bottom plan view of the carrying case and showing in dotted lines the loader carried therein;

FIG. 3 is a bottom plan view showing the automatically openend position of the carrying case with the loader presented in its closed position ready for manual removal;

FIG. 4 is a side elevation partially in vertical section showing the engagement of the loader with a revolver cylinder and with the cartridges transferred therefrom to the cylinder;

FIG. 21 is a horizontal sectional view on an enlarged scale of the loader taken along the line 21—21 of FIG. 23;

FIG. 22 is a horizontal sectional view of one of the half-parts of the loader taken along the line 22—22 of FIG. 25;

FIG. 23 is a vertical sectional view taken along the line 23—23 of FIG. 21 and showing in dot-and-dash lines the cartridges retained therein;

FIG. 24 is a vertical sectional view of one of the half-parts of the loader taken along the line 24—24 of FIG. 21 and showing the cartridge retaining locking member in locked position;

FIG. 25 is a vertical sectional view taken along the line 25—25 of FIG. 22 and showing the cartridge retaining locking member in unlocked position;

FIG. 26 is a horizontal sectional plan view of the carrying case taken along the line 26—26 of FIG. 27;

FIG. 27 is a view partially in vertical section and partially in elevation taken along the line 27—27 of FIG. 26, the parts of the carrying case being shown in their relationship when the carrying case is closed without a loader in place therein;

FIG. 28 is a vertical longitudinal sectional view taken along the line 28—28 of FIG. 26;

FIG. 29 is a vertical transverse sectional view taken along the line 29—29 of FIG. 26;

FIG. 30 is a vertical transverse sectional view taken along the line 30—30 of FIG. 26;

FIG. 31 is a vertical longitudinal sectional view taken along the line 31—31 of FIG. 26 and showing the carrying case in its open position with the loader being placed therein;

FIG. 32 is a similar view showing the carrying case closed with the loader therein, this view showing the parts in the same position illustrated in FIG. 2;

FIG. 33 is a similar view showing the carrying case opened and automatically presenting the loader in its closed position ready for manual removal, this view showing the parts in the same position illustrated in FIG. 3.

Figure 5:
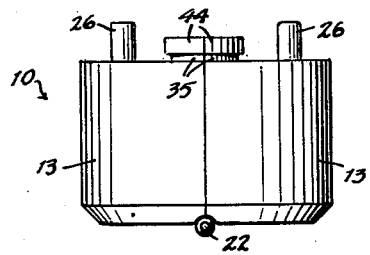
FIG. 5 is a side elevation of the loader in its closed position.
Figure 7:
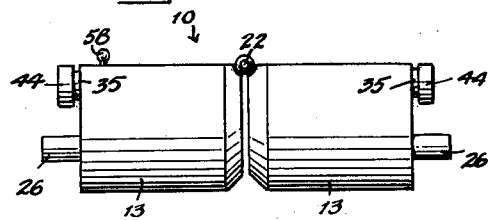
FIG. 7 is a side elevation in its open position.

Referring to the drawings, and more particularly to FIGS. 1-4, the loader 10 is adapted to be carried ready for use in a carrying case 11 adapted, as will hereinafter more fully appear, to automatically open upon manual release of a retaining latch to present the loader in an exposed closed position as indicated in FIG. 3, where it may be manually removed with the complement of cartridges carried thereby oriented downwardly in position for registering engagement with the revolver cylinder 12 as shown in FIG. 4. This engagement, as will hereinafter more fully appear, releases the cartridges from the loader and allows them to be transferred therefrom by gravity to the respective chambers of the cylinder.

Figure 6:
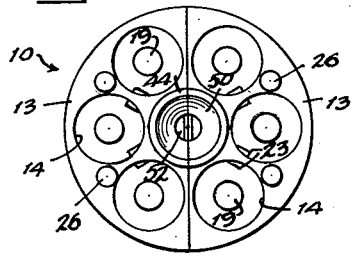
FIG. 6 is a top plan view.
Figure 8:
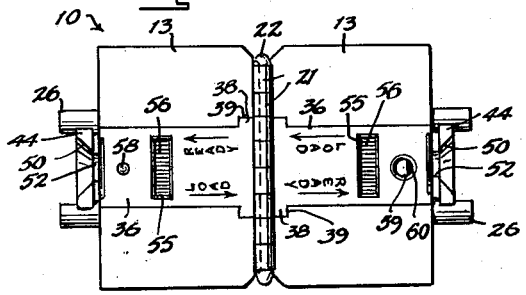
FIG. 8 is a top plan view.
Figure 9:
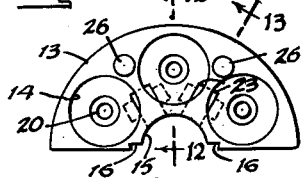
FIG. 9 is a top plan view of one of the pair of body members of the loader.
Figure 12:
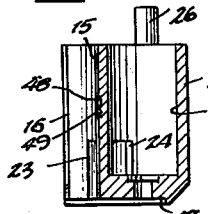
FIG. 12 is a vertical sectional view taken along the line 12—12 of FIG. 9.

Referring particularly to FIGS. 5–25, the loader 10 comprises a pair of substantially identical half-parts hinged together so that they are movable between open and closed positions in clam-shell fashion, the loader in its closed position as seen in FIGS. 5 and 6 presenting a generally cylindrical body structure. Each half-part comprises a semi-cylindrical body member 13, FIGS. 9–13, having a substantially rectangular flat inner face, substantially semi-circular top and bottom faces disposed in spaced parallel planes at right angles to the plane of the inner face, and a substantially semi-cylindrical outer face, and is preferably molded from suitable plastic material and provided with three cartridge-receiving cylindrical pockets 14 opening to the top face and circumferentially arranged so that in the closed relation of the two half-parts as seen in FIG. 6 they register with the six chambers of the conventional cylinder of a service revolver. It will be understood of course that the invention is not limited in this respect but may be modified to accommodate cylinders of different capacities.

Centrally of the flat inner face of the body 13 there is provided a semi-cylindrical slide passage 15 having dovetail grooves 16 along each vertical edge for a purpose presently to more fully appear. In the lower edge there is provided a semi-circular recess 17 in which one of a pair of semi-circular base plates 18, FIG. 23, is secured by rivets 19 engaged in countersunk holes 20 provided centrally through the base walls of the pocket 14. The semi-circular base plates 18 are hingedly connected by interengaging hinge formations 21 and a hinge pin 22 having its axis coinciding with the central meeting plane of the half-parts of the loader.

The body member 13 is provided in its lower part with a pair of recesses 23—23 which open to the passage 15 and to the recess 17 in its lower side and are disposed along radial lines midway between the cartridge-receiving pockets 14 with their side and inner walls intersecting the cylindrical walls of the pockets so that each recess 23 opens into two of the pockets through openings 24 for allowing the movement into and out of the pockets of cartridge-retaining locking members, hereinafter more fully described. Extending from each side wall of each recess 23 and spaced below the pockets 14 are bearing recesses 25 opening to the recess 17 in the lower side of the body member, and which are adapted to pivotally receive the pivot means of the locking members as will presently more fully appear. In the assembled structure the recesses 23 and 25 are closed at their lower sides by the base plate 18, as is clear from FIGS. 24 and 25.

At the upper face of the body projecting positioning pins 26 are provided between the open ends of the pockets 14 for the purpose of positioning engagement with the end of the revolver cylinder as shown in FIG. 4.

Figures 18, 19:
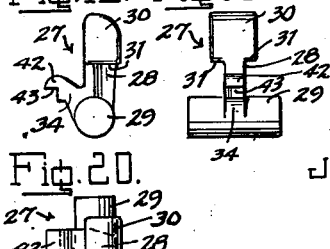
FIG. 18 is a side elevation on an enlarged scale of one of the cartridge retaining locking members employed in the loader.
FIG. 19 is a front elevation thereof.
Figure 20:
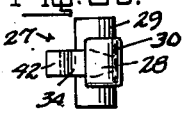
FIG. 20 is a top plan view.

A locking member 27, shown in detail in FIGS. 18–20, is provided in each of the recesses 23 and comprises a lever arm 28 having a cylindrical pivot bar 29 extending at each side of its lower end and a locking head 30 at its upper end having locking shoulders 31 at each side. The pivot bar 29 is pivotally engaged in the bearing recesses 25 and the lever arm 28 is movable within the recess 23 so that in the locking position as seen in FIGS. 21, 23 and 24 the head 30 projects through the openings 24 into the cartridge receiving pockets 14 where the shoulders 31 engage over the flanges 32 of cartridges 33 placed in the pockets, as shown by the dot-and-dash lines of FIG. 23. In the unlocking position as seen in FIGS. 22 and 25 the head is moved out of the openings 24 to release the cartridges. An actuating arm 34 diagonally from the lever arm 29 in the manner of a bell-crank lever for cooperative engagement with an actuating slide member 35 engaged for vertical sliding movement in the slide passage 15.

Figures 14, 15:
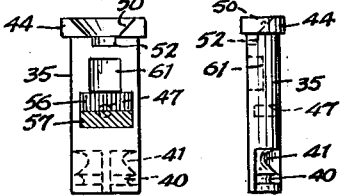
FIG. 14 is a front elevation showing one of the pair of locking slide members employed in the loader.
FIG. 15 is a side elevation thereof.
Figure 10:
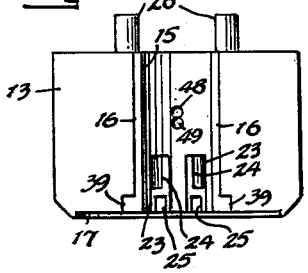
FIG. 10 is a side elevation.
Figure 13:
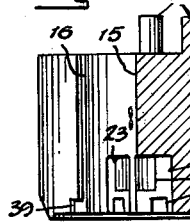
FIG. 13 is a vertical sectional view taken along the line 13—13 of FIG. 9.
Figures 16, 17:
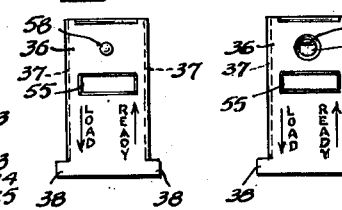
FIG. 16 is a front elevation of one of the pair of cover plates employed in the loader.
FIG. 17 is a front elevation of the other of the pair of cover plates.
Figure 11:
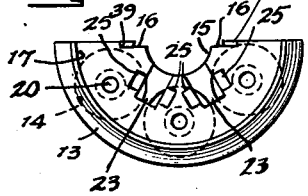
FIG. 11 is a bottom plan view.

The slide member 35, FIGS. 14 and 15, is of generally semi-cylindrical form to conform to the slide passage, and is retained therein by a cover plate 36, FIGS. 16 and 17, of generally rectangular form provided with beveled side edges 37—37 for interlocking engagement in the dovetail grooves 16 of the body member. Retaining lugs 38—38 are provided at its lower corners which in the assembled position as shown clearly in FIG. 8 engage in cutouts 39—39 at the lower ends of the dovetail grooves 16. The cover plate is conveniently assembled following the assembly of the slide member 35 and the locking members 27, and before assembly of the base plate 18, by sliding it upwardly in the dovetail grooves 16 to bring the lugs 38 into the cutouts 39 whereupon the assembly of the base plate 18 closes the lower ends of the recesses 23 and 25, the slide passage 15, and the cutouts 39, to thus retain the cover plate as well as the slide member 35 and locking members 27 in place.

The slide member 35 is provided in its lower end portion with a groove 40 in which the actuating arm 34 of each of the locking members 27 is engaged for movement between its cartridge-locking and cartridge-releasing positions, and immediately above the groove 40 there is provided a clearance cutout 41 into which the heads of the locking members move in the cartridge-releasing position as clearly shown in FIGS. 22 and 25. The actuating arm 34 is provided with a rounded nose 42 for movement in the groove 40 and with a right-angular recess 43 for engaging the right-angular corner formed by the lower side of the groove 40 and the inner wall of the slide member, the rounded nose being such that as the slide member 35 is moved from the raised position, FIG. 24, to the lowered position, FIG. 25, it is engaged by the upper side of the groove and swings into it at the same time that the right-angular recess 43 swings out of engagement with its lower side. The locking member is thus positively held in either of its positions as well as during its movement between these positions.

The upper end of the slide member 35 extends above the body member 13 and is provided with a semi-circular shouldered head 44. In the assembled loader the heads 44 of the two half-parts form a circular head when the loader is closed. The head 44 enables the slide member to be manually projected and retracted to actuate the locking members during the placing of cartridges in the loader, and is also adapted as will hereinafter more fully appear to be actuated through engagement with the revolver cylinder to release the cartridges.

In order to limit the movement of the slide member and yieldably retain it in its two positions a detent ball 45 and spring 46 are disposed in a lateral cylindrical pocket 47, the ball engaging respectively in recesses 48 and 49 in the slide passage in the respective projected and retracted positions of the slide member.

The shouldered head 44 of the slide member is provided with a semi-conical recess 50 at its inner side which, with the mating recess of the other slide member in the assembled and closed relation of the two half-parts of the loader, forms a conical centering recess for centering engagement with the propelling ratchet formation 51 provided centrally of the end of the revolver cylinder 12 as seen in FIG. 4. The centering recess converges to a semi-cylindrical pocket 52 which forms with the mating pocket a cylindrical pocket for receiving the spring loaded centering pin 53 of the revolver cylinder. It is pointed out that the centering means for engaging the revolver cylinder may be varied to suit the particular shape of the revolver cylinder. In any case the engagement is such that as the loader is brought into registering relation to the cylinder with the projecting ends of the cartridges engaged in the chambers 54 the slide members are pressed from the projected position as seen in FIGS. 23 and 24 to the retracted position as seen in FIG. 25. The retracted position is reached at the point where the positioning pins 26 come into leveling contact with the end of the cylinder, thus ensuring the positive transfer of the cartridges by gravity from the loader to the cylinder chambers upon their release by the locking members 27.

In order to visually indicate that the locking members are in cartridge-retaining position the cover plate 36 of each of the half-parts is provided with a window opening 55 through which one or the other of two colored bands 56 and 57 is exposed in the respective operative positions of the slide member, one of the bands, colored red for example, indicating that the slide member is not in locking position, and the other band, colored green for example, indicating that the slide member is in locking position. Suitable legends as for instance "Load" and "Ready" with direction indicating arrows may be provided upon the cover plates to indicate the directions in which the slide members are movable to unlocked position for placing cartridges in the loader and to locked position to retain the cartridges therein.

Suitable latch means for releasably retaining the half-parts in their closed position is provided upon the cover plates 36. In the illustrated embodiment such means consists of a projecting ball-end pin 58 riveted to one cover plate, FIG. 16, and engageable in an aperture 59 in the other cover plate, FIG. 17, having a retaining spring wire 60 extended across it, so that in opening and closing the loader the ball-end pin will flex and snap past the spring wire. Suitable clearance pockets 61 are provided in the slide members to accommodate the latch means.

Referring particularly to FIGS. 1–3 and 26–33, the carrying case of the invention comprises a base member or receptacle part 62 and a pair of hinged cover members 63 and 64 preferably formed of molded plastic material, the case being generally rectangular in plan and longitudinally curved to substantially conform to a supporting belt worn about the waist of the user.

The cover member 63 comprises a top wall 65 and side walls 66 disposed inwardly of the side walls of the base member and respectively provided with bearing holes 67 pivotally engaged by identical pivot assemblies 68—68. The pivot assemblies, as shown in detail in FIG. 30, each comprise a shouldered externally threaded head 69 engaged from the inner side in a bearing bushing 70 disposed in the bearing hole 67 and secured by a screw 71 engaged through a hole 72 in the side wall of the base member. The outer end of the cover member is curved in concentric relation to the pivot axis to move within the end wall of the base member, and shoulder formations 73 are provided along its sides to engage the upper edges of the side walls of the base member in the closed position. A recess 74 is provided along the inner edge of the cover member 63 for interlocking engagement with the inner edge of the cover member 64, as will presently more fully appear.

The cover member 64 is generally similar to the cover member 63 and comprises a top wall 75 curved at its outer end to move within the end wall of the base member, side walls 76 having bearing holes 77, and shoulder formations 78 at its sides for engagement with the upper edges of the side walls of the base member, the bearing holes being engaged by pivot assemblies 79 and 80 carried by the respective side walls of the base member. The pivot assembly 79 comprises an internally threaded head 81 engaged in a bearing bushing 82 disposed in the hole 77 at one side and secured by a screw 83 engaged through the side wall of the base member. The pivot assembly 80 comprises a shouldered internally threaded head 84 engaged in a bearing bushing 85 disposed in the bearing hole 77 at the other side and secured by a screw 86 engaged through the side wall of the base member. At its inner end the cover member 64 is provided with a lip 87 for engagement within the recess 74 of the cover member 63 in the closed position, and whereby retention of the cover member 63 by catch means, hereinafter more fully described, retains the cover member 64 closed.

The cover member 63 is provided intermediate its ends with a transverse wall 88 for supporting one of the half-parts of the loader, being provided for this purpose with three apertures 89 arranged to receive the three cartridges carried thereby and with a pair of apertures 90 for receiving its two positioning pins 26. A semi-circular cut-out 91 is provided in the lower edge of the transverse wall for receiving the head 44 of the actuating slide member 35 of the half-part.

Within the space between the transverse wall 88 and the end of the base member there is provided a saddle member 92 having apertured end flanges 93—93 pivotally engaged in annular grooves 94 of the heads 69 of the pivot assemblies 68, and having an intermediate V-shaped portion 95 for coupling engagement by the projected end of the cartridge engaged in the centrally disposed cartridge receiving hole 89 of the transverse wall 88. The saddle member is normally retained under spring pressure in a position in which the intermediate portion 95 is aligned with the central cartridge receiving aperture 89 in the open position of the cover member 63. For this purpose coil springs 96—96 are engaged about the heads 69 of the pivot assemblies 68 at the inner sides of the side flanges 93 of the saddle member, one end of each spring being fixed in a hole 97 in the adjacent side flange and the other end being fixed in a stop projection 98 provided upon the bottom wall of the base member 62. The side flanges have stop lugs 99 which normally engage the stop projections under the pressure of the springs. Thus as seen in FIG. 27 the springs exert pressure on the saddle member in counter-clockwise direction to normally retain it against the stop projections, and are placed under increased tension through rotation of the saddle member in clockwise direction, i.e., through closing of the cover member 63 with the saddle member coupled to it.

Between each end flange 93 of the saddle member and the adjacent side wall 67 of the cover a coil spring 100 is provided about the pivot assembly, one leg of the spring being engaged in a notch 101 in the outer edge of the cover and the other leg being engaged with the stop projection 98. While the cover springs 100 exert closing pressure upon the cover they are substantially weaker than the saddle springs 96, with the result that when the cover is coupled to the saddle and moved to its closed latched position, as will presently more fully appear, subsequent release of the cover allows the coupled cover and saddle to move to open position under the pressure of the saddle springs in opposition to the normal closing pressure of the cover springs.

The retaining latch for the cover member 63 comprises a slide bar 102 engaged in a transverse recess 103 in the bottom wall of the case with its ends guided in slots 104 and 105 in the respective side walls. Adjacent its end engaged in the slot 104 the slide bar is provided with an aperture 106 engaged by the lower end of a latch lever 107 pivotally supported intermediate its ends upon a pivot pin 108 provided in a mounting block 109 secured to the side wall by a screw 110. A latching nose 111 at the upper end of the latch lever is adapted in the unlatched position to move into a clearance recess 112 in the side wall and in the latched position, FIG. 29, to engage over the lip of an L-shaped keeper plate 113 secured by a pin 114 in a slot 115 in the cover member.

The other end of the slide bar projects from the case and is provided with a curl end 116 pivotally engaged by a pin 117 provided across a notch 118 in the inner end of an actuating finger lever 119. The finger lever is normally retained in its latched position by a ball-end screw 120 secured in the side wall of the case and engaged with a transverse spring wire 121 provided across an aperture 122 in the finger lever, outward or inward pressure upon the finger lever causing the ball-end to flex and snap under the spring wire to release or retain it. The outer end of the finger lever is provided with a suitably knurled knob 123 for convenient actuation by the thumb or finger of the user, it being pointed out that the knurled knob is normally protected from accidental actuation by its disposition in inwardly offset relation at the underside of the case where it cannot be engaged by the clothing or inadvertently actuated by the hand or other objects brushing against it. At the same time it is conveniently accessible for intentional actuation by the thumb or finger of the user. At each side of the notch 118 there is provided a cam projection 124 adapted upon outward swinging movement of the finger lever to engage a slotted wear plate 125 set into a recess 126 in the case to move the slide bar 102 in unlatching direction, such movement being to the left from the position as seen in FIG. 29 and imparting clockwise movement to the latch lever 107 to release it from the cover.

The slide bar 102 is spring loaded to normally press it to the latching position and for this purpose a spring 127 anchored to the side wall of the case by a screw 128 is engaged against an angle bracket 129 secured by a rivet 130 to the bar 102. The rivet head at the lower side of the slide bar is movable in a clearance slot 131 in the bottom wall of the case which limits the movement of the slide bar.

In order to positively close the loader as it is presented for manual removal upon opening of the case, as seen in FIGS. 3 and 33, means is provided for automatically pressure closing the cover member 64 against the loader to close the loader at a predetermined point in the opening movement of the cover member 63. An impeller plate 132 having an annular hub flange 133 is pivotally engaged upon the head 84 of the pivot assembly 80, and is provided with a slot 134 concentric to its pivot axis and engaged by a detent pin 135 provided upon a detent lever 136, the latter having its internally threaded shouldered hub 137 pivotally engaged in a countersunk hole 138 in the side wall of the case where it is retained by a screw 139 having its head disposed for turning movement in the counterbore of the hole 138. The slot 134 has a relatively narrow upper portion, in which the pin is restrained against movement, and a relatively wide lower portion in which the pin may swing laterally, there being a shoulder 140 at the junction of the narrow and wide portions of the slot for detent engagement by the pin 135.

The impeller plate 132 is spring loaded for rotation in counter-clockwise direction, as seen in FIGS. 27 and 31–33, and in clockwise direction as seen in FIG. 28, a coil spring 141 being engaged about its hub flange 133 with the bent end of one leg engaged in a hole 142 in the plate and the bent end of its other leg engaged in a stop projection 143 provided upon the bottom wall of the case. A lug 144 bent from the impeller plate is arranged to engage the transverse edge of the curved end portion of the cover member 64 for cooperative action between the cover member and the impeller plate, as will presently more fully appear.

The detent lever 136 is also spring loaded for swinging movement in clockwise direction as seen in FIGS. 27 and 31–33, and counter-clockwise direction as seen in FIG. 26, a coil spring 145 being engaged about its hub portion with one leg engaged with an edge portion 146 of the cover member 64 disposed in concentric relation to the pivot assembly 80, and its other leg engaged with a pin 147 pivotally connecting the lower end of the detent lever 136 with a longitudinally movable actuating bar 148. The bar 148 is slideably connected to the angle bracket 129 of the transverse slide bar 102 by a headed stud 149 secured to the angle bracket and slideably engaged in a slot 150 in the actuating bar. The end of the bar extends through a clearance cutout 151 provided in the lower corner of the transverse wall 88 of the cover member 63 in position for actuation by the cover member 63 at a predetermined point in its opening movement. The actuating bar 148 is adapted to have its end portion transversely moved from a position where it is out of the path of an actuating projection 152 provided upon the side wall of the cover member 63 to a position in the path of this projection, such movement taking place through movement of the latch actuating slide bar 102 to its latch releasing position, i.e., upon movement to the left from the position as seen in FIG. 29. A stop projection 153 in the base limits excessive manual opening movement of the cover member 63.

A pressure leaf spring 154 is secured interiorly of the top wall 75 of the cover member 64 by means of a screw 155 and bears upon the half-part of the loader disposed beneath the cover member 64 in the closed position of the case to firmly retain it against looseness. In the base wall of the case there are provided clearance pockets 156 and 157, either of which is engageable by the projecting latching pin 58 of the loader depending upon the position in which the loader is assembled with the case. In FIGS. 2 and 32 the pocket 157 is shown engaged by the pin.

The case is adapted to be conveniently supported upon the belt of the user and for this purpose the base member 62 is provided with a pair of spring clip members 158—158 secured in recesses 159—159 by rivets 160. In order to conveniently link the series of cases together, loop members 161 and 162 are secured to the respective end walls of the case by rivets 163, the loop member 161 having a series of loops staggered with relation to the series of loops of the loop member 162, so that the loop member 161 of one case may be engaged with the loop member 162 of an adjacent case and thereupon secured together by inserting a cartridge 33 as a retaining pin through the interengaging loops.

The operation of placing the cartridge carrying loader in the case and the subsequent opening of the case to automatically present the loader for use is as follows: Assume the case to be empty with the cover members 63 and 64 closed as seen in FIGS. 27 and 28. In this state the cover member 64 is spring pressed to its closed position by the impeller plate 132, the latter being in its released position with the detent pin 135 in the narrow upper portion of the slot 134, and the cover member 63 is spring pressed to its closed position by the cover springs 100 and retained by the latch lever 107. The saddle member 92 is positioned by the saddle springs 96 against the stop projections 98 with its V-shaped cartridge engaging portion 95 out of alignment with the central cartridge receiving hole 89 in the transverse wall 88 of the cover member 63.

The latch lever 107 is released by actuation of the finger lever 119 and the cover member 63 is manually opened against the pressure of the cover springs 100 to the point as seen in FIG. 31 where the central cartridge receiving hole 89 in the transverse wall 88 is aligned with the V-shaped cartridge receiving portion 95 of the saddle member 92. Thereupon the projected ends of the cartridges in one half-part of the loader are inserted in the holes 89 with the central cartridge engaging with the V-shaped portion 95 of the saddle member to thus couple the cover member 63 to the saddle member. During this operation the cover member 64 is manually moved to an open position from its closed position as seen in FIG. 27 causing the impeller plate 132 to be turned in clockwise direction against the pressure of its spring 141 to a point where the detent pin is disposed in the wide lower portion of the slot 134 and allows the detent lever 136 to move in clockwise direction under pressure of its spring 145 and bring the detent pin under the shoulder 140 to thus retain the impeller plate in its spring loaded cocked position as seen in FIG. 32. Upon cocking of the impeller plate the cover member 64 becomes freely movable between its closed and open positions enabling the opened half-parts of the loader to be moved into the case through closing pressure applied to the cover member 63, the cover member 64 being closed slightly ahead of the cover 63 so that the lip edge 87 of the cover member 64 engages within the retaining recess 74 of the cover member 63. As the cover member 63 is pressed to its closed position it carries with it the saddle member coupled thereto by the inter-engaging cartridge, thus disposing the saddle member in the tensioned position as seen in FIG. 32 where it is retained through retention of the cover by the snap engagement of the latch lever 107 therewith.

During the placing of the loader in the case the actuating bar 148 has its end positioned as seen in FIG. 29 out of alignment with the actuating projection 152 carried by the cover member 63, so that the latter may be moved to its fully opened position while placing the loader in the case without causing the actuating bar to be moved to release the cocked impeller plate. In the closed position of the case as seen in FIG. 32 the half-part of the loader engaged with the cover member 63 is retained against movement through the spring loaded engagement of the saddle with the cartridge, while the other half-part is retained against movement by the spring 154 pressing it against the bottom wall of the case.

In order to remove the loader from the case the finger lever 119 is pressed downwardly to release its snap catch and pull the transverse slide bar 102 to the left from the position as seen in FIG. 29 causing the latch lever 107 to release the cover member 63. The cover member and the coupled saddle member 92 thereupon instantly move to open position through the motivation of the tensioned saddle springs 96, thus bringing the loader to the position as seen in FIG. 33. During the initial opening movement of the cover member 63 the cover member 64 is freely movable to its open position from the position as seen in FIG. 32 as the two half-parts of the loader are drawn toward each other.

During the instantaneous opening movement of the cover member 63 the latch actuating finger lever 119 is still held in its outwardly moved position where through movement of the slide bar 102 it has brought the end of the actuating bar 148 into the path of the actuating projection 152. At the point where the cover member reaches its fully opened position the projection 152 engages and moves the bar 148 from the position as seen in FIG. 32 to the position as seen in FIG. 33, causing the detent lever 136 to be moved in counter-clockwise direction to release the detent pin 135 from the shoulder 140 of the cocked impeller plate 132, whereupon the latter moves in counter-clockwise direction under the pressure of its spring 141 from the position as seen in FIG. 32 to the position as seen in FIG. 33, causing the open cover member 64 to be propelled by the power of the released impeller plate to its closed position. During this closing movement its lip edge 87 moves against the side of the partially open loader and forces it into its fully closed position where it is retained through the snap engagement of its ball-end catch. FIG. 33 shows a transition of the cover member 64, it being pointed out that under the force of the impeller plate it moves without interruption to its fully closed position.

The loader is thus presented for manual removal from the case with the cartridges oriented downwardly for placing into registering relation with the chambers of the revolver cylinder. Downward pressure upon the loader to bring the positioning pins 26 into firm leveling contact with the upper surface of the cylinder causes the slide members 35 of the loader to be pressed inwardly to release the cartridges which thereupon drop by gravity into the chambers of the cylinder, as seen in FIG. 4.

What is claimed is:

1. A cartridge loader for revolvers, for loading cartridges of the type having a rearward rim flange end and a forward projectile end, comprising:
   a body including a pair of substantially identical half-parts each having a substantially rectangular inner face, top and bottom faces disposed in spaced parallel planes at right angle to the plane of said inner face, and an outer face;
   hinge means at the junction of said inner faces with said bottom faces connecting said half-parts together whereby they are movable between a closed position with said inner faces meeting in a central plane and an open position in which said bottom faces oppose each other and said inner faces extend in opposite directions from said hinge means;
   said half-parts each having a series of spaced parallel cartridge receiving pockets opening to its top face and terminating in spaced relation to its bottom face, said pockets constituting an annular series in said closed position of said half-parts, and being of equal and substantial depth to axially receive equal length cartridges of substantially greater length than the depth of said pockets with their rim flange ends disposed in said pockets and a substantial length of their projectile ends projecting therefrom;
   retaining means carried by each of said half-parts for releasably retaining cartridges received in said pockets thereof through movement into and out of retaining relation with the rim flanges of said cartridges;
   actuating means carried by each of said half-parts for common actuation of said retaining means thereof and operable idependently of each other in the open position of said half-parts; and
   means for releasably retaining said half-parts in closed position.

2. The invention as defined in claim 1, wherein each said half-part has three of said cartridge receiving pockets, and wherein each said half-part has two of said retaining means each common to two or said three pockets.

3. The invention as defined in claim 1, wherein each said half-part has three of said cartridge receiving pockets arranged as one intermediate pocket and two end pockets, and wherein each said half-part has two of said retaining means, one common to said intermediate pocket and one of said end pockets, and the other common to said intermediate pocket and the other end pocket.

4. The invention as defined in claim 1, wherein said actuating means of said pair of half-parts have end means which in the closed position are exposed and contiguously disposed for common actuation.

5. The invention as defined in claim 1, wherein said actuating means of said pair of half-parts have matching ends which in the closed position are exposed and contiguously disposed centrally of the top face of the loader for common actuation through pressing engagement with the end of a revolver cylinder.

6. The combination of a cartridge loader for revolvers, for loading cartridges of the type having a rearward rim flange end and a forward projectile end, and a carrying case for automatically presenting said loader for grasping when said case is opened:
   said loader comprising:
      a body including a pair of substantially identical half-parts, each having a substantially rectangular inner face, top and bottom faces disposed in spaced parallel planes at right angle to the plane of said inner face, and an outer face;
      hinge means at the junction of said inner faces with said bottom faces connecting said half-parts together whereby they are movable between a closed position with said inner faces meeting in a central plane and an open position in which said bottom faces oppose each other and said inner faces extend in opposite directions from said hinge means;
      said half-parts each having a series of spaced parallel cartridge receiving pockets opening to its top face and terminating in spaced relation to its bottom face, said pockets constituting an annular series in said closed position of said half-parts, and being of equal and substantial depth to axially receive equal length cartridges of substantially greater length than the depth of said pockets with their rim flange ends disposed in said pockets and a substantial length of their projectile ends projecting therefrom;

retaining means for releasably retaining cartridges received in said pockets;

and means for releasably retaining said half-parts in closed position; and said carrying case comprising:
- a receptacle part having a base wall, side walls, and end walls defining a receptacle space opening opposite its said base wall end of a length to receive said loader having cartridges received therein with its half-parts in open position with their inner faces opposing said base wall;
- a cover member movably carried by said receptacle part for movement between open and closed position and having means for receiving the projectile ends of the cartridges received in one half-part of said loader;
- catch means for releasably retaining said cover member in closed position; and
- spring-loaded cover opening means carried by said receptacle part for moving said cover member to open position wherein said loader is presented for grasping by the user.

7. The invention as defined in claim 6, wherein said spring-loaded cover opening means is adapted for coupling engagement by the projectile ends of said cartridges received by said cover member for moving said cover member to an open position wherein said loader is presented for grasping by the user.

8. The invention as defined in claim 6, wherein said spring-loaded cover opening means is adapted for coupling engagement by the projectile ends of said cartridges received by said cover member for moving said cover member to an open position wherein said loader is presented for grasping by the user, and further characterized by spring means for imparting closing movement to said cover member in its uncoupled relation with said cover opening means.

9. The combination of a cartridge loader for revolvers, for loading cartridges of the type having a rearward rim flange end and a forward projectile end, and a carrying case for automatically presenting said loader for grasping when said case is opened:

said loader comprising:
- a body including a pair of substantially identical half-parts, each having a substantially rectangular inner face, top and bottom faces disposed in spaced parallel planes at right angle to the plane of said inner face, and an outer face;
- hinge means at the junction of said inner faces with said bottom faces connecting said half-parts together whereby they are movable between a closed position with said inner faces meeting in a central plane and an open position in which said bottom faces oppose each other and said inner faces extend in opposite direction from said hinge means;
- said half-parts each having a series of spaced parallel cartridge receiving pockets opening to its top face and terminating in spaced relation to its bottom face, said pockets constituting an annular series in said closed position of said half-parts, and being of equal and substantial depth to axially receive equal length cartridges of substantially greater length than the depth of said pockets with their rim flange ends disposed in said pockets and a substantial depth of their projectile ends projecting therefrom;
- retaining means for releasably retaining cartridges received in said pockets; and
- means for releasably retaining said half-parts in closed position; and said carrying case comprising:
- a receptacle part having a base wall, side walls, and end walls defining a receptacle space opening opposite its said base wall end of a length to receive said loader having cartridges received therein with its half-parts in open position with their inner faces opposing said base wall;
- a first cover member movably carried by said receptacle part for movement between open and closed positions and having means for receiving the projectile ends of the cartridges received in one half-part of said loader;
- catch means for releasably retaining said first cover member in closed position;
- spring-loaded cover opening means carried by said receptacle part for moving said first cover member to open position wherein said loader is presented for grasping by the user;
- a second cover member movably carried by said receptacle part for movement between open and closed positions, normally retained in closed position by the closed first cover member and movable to an open position upon opening of said first cover member; and
- spring-loaded impeller means for moving said second cover member to closed position in the open position of said first cover member and arranged to engage the other half-part of said loader and move it to closed position relatively to said one half-part.

10. The invention as defined in claim 9, further characterized by detent means for releasably retaining said impeller means in tensioned position, and detent actuating means for actuation at a predetermined point in the opening movement of said first cover member to cause said detent means to release said impeller means.

11. The invention as defined in claim 10, further characterized by manually operable means for actuating said catch means to cover releasing position, and a connection between said last named means and said detent actuating means for disposing said detent means in a position for actuation by said first cover member.

12. The combination of a cartridge loader for revolvers, for loading cartridges of the type having a rearward rim flange end and a forward projectile end, and a carrying case for automatically presenting said loader for grasping when said case is opened:

said loader comprising:
- a body including a pair of substantially identical half-parts, each having a substantially rectangular inner face, top and bottom faces disposed in spaced parallel planes at right angle to the plane of said inner face, and an outer face;
- hinge means at the junction of said inner faces with said bottom faces connecting said half-parts together whereby they are movable between a closed position with said inner faces meeting in a central plane and an open position in which said bottom faces oppose each other and said inner faces extend in opposite direction from said hinge means;
- said half-parts each having a series of spaced parallel cartridge receiving pockets opening to its top face and terminating in spaced relation to its bottom face, said pockets constituting an annular series in said closed position of said half-parts, and being of equal and substantial depth to axially receive equal length cartridges of substantially greater length than the depth of said pockets with their rim flange ends disposed in said pockets and a substantial length of their projectile ends projecting therefrom;
- retaining means for releasably retaining cartridges received in said pockets; and means for releasably retaining said half-parts in closed position; and said carrying case comprising:
- a receptacle part having a base wall, side walls, and end walls defining a receptacle space opening opposite its said base wall and of a length to receive said loader having cartridges received therein with its half-parts in open position with their inner faces opposing said base wall;
- a cover member carried by said receptacle part adjacent one end wall thereof for movement about a transverse axis between open and closed positions and having a transverse wall projecting from its inner side and arranged for disposition in the closed position of said cover member within said receptacle space in substantially perpendicular relation to said base wall, said transverse wall having a plurality of apertures for receiving the projectile ends of the cartridges received in one half-part of said loader;
- catch means for releasably retaining said cover member in closed position; and
- a spring-loaded saddle member carried by said receptacle part between said one end wall thereof and said transverse wall of said cover member adapted for coupling engagement by the projectile ends of the cartridges received in said apertures of said transverse wall and arranged for movement about a transverse axis between a spring-biased position wherein said loader is disposed in an outwardly projected position with respect to said receptacle space and a tensioned position wherein said loader is disposed within said casing in its open position with the inner faces of its half-parts facing said base wall.

References Cited in the file of this patent

UNITED STATES PATENTS

| | | |
|---|---|---|
| 527,166 | Watson | Oct. 9, 1894 |
| 710,324 | Hylard | Sept. 30, 1902 |
| 1,964,171 | Pflaume | June 26, 1934 |
| 1,968,767 | Howard | July 31, 1934 |
| 1,971,526 | Kempf | Aug. 28, 1934 |
| 2,399,904 | Baucum | May 7, 1946 |
| 2,406,232 | Lima | Aug. 20, 1946 |
| 2,620,584 | Edmands | Dec. 9, 1952 |